(12) United States Patent
Kobayashi et al.

(10) Patent No.: US 10,506,039 B2
(45) Date of Patent: Dec. 10, 2019

(54) MOBILE PRINTING APPARATUS IN A PRINTING SYSTEM

(71) Applicant: FUJI XEROX CO., LTD., Tokyo (JP)

(72) Inventors: Tetsuya Kobayashi, Yokohama (JP);
Mariko Miyazaki, Yokohama (JP);
Hideki Fujimoto, Yokohama (JP);
Kunitoshi Yamamoto, Yokohama (JP);
Hajime Kajiyama, Yokohama (JP);
Naoya Ogata, Yokohama (JP); Akira Ichikawa, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 500 days.

(21) Appl. No.: 15/237,220

(22) Filed: Aug. 15, 2016

(65) Prior Publication Data
US 2017/0279885 A1    Sep. 28, 2017

(30) Foreign Application Priority Data
Mar. 24, 2016   (JP) .................................. 2016-059312

(51) Int. Cl.
*G06F 3/12*   (2006.01)
*H04L 29/08*   (2006.01)
(Continued)

(52) U.S. Cl.
CPC ............ *H04L 67/1095* (2013.01); *G01S 1/00* (2013.01); *G01S 5/0252* (2013.01); *G01S 5/14* (2013.01);
(Continued)

(58) Field of Classification Search
CPC ... G06F 3/1291; G06F 3/1292; H04N 1/4406; H04N 1/4413; H04N 1/00347
See application file for complete search history.

(56) References Cited

U.S. PATENT DOCUMENTS 9,025,192 B1 * 5/2015 Majid .................... G06F 3/1204
   358/1.15
2008/0239392 A1 * 10/2008 Nanaumi ............... G06K 15/02
   358/1.15
(Continued)

FOREIGN PATENT DOCUMENTS

JP   2014-071845 A   4/2014
JP   2014-209293 A   11/2014
(Continued)

OTHER PUBLICATIONS

Aug. 1, 2017 Extended Search Report issued in European Patent Application No. 16186800.5.
(Continued)

*Primary Examiner* — Eric A. Rust
(74) *Attorney, Agent, or Firm* — Oliff PLC

(57) ABSTRACT

A service providing system includes a mobile apparatus that moves to a user in response to receiving an instruction to provide a service from the user and provides the service to the user after obtaining approval; and a client apparatus that manages a schedule input by the user, and, in response to receiving the instruction, transmits an instruction which is derived from the received instruction, the received instruction including information of at least one of a designated date and time and a designated location at which the service is to be provided. The client apparatus includes a display that displays a schedule in which a service providing schedule is added to the schedule input by the user according to a schedule display instruction, and the mobile apparatus moves to a scheduled location at a scheduled date and time and provides the service.

11 Claims, 22 Drawing Sheets

(51) Int. Cl.
  *H04L 29/06* (2006.01)
  *G01S 1/00* (2006.01)
  *G06Q 10/08* (2012.01)
  *G01S 5/02* (2010.01)
  *G01S 5/14* (2006.01)

(52) U.S. Cl.
  CPC ............ *G06Q 10/08* (2013.01); *H04L 67/16* (2013.01); *H04L 67/32* (2013.01); *H04L 67/42* (2013.01)

(56) References Cited

U.S. PATENT DOCUMENTS

| | | | |
|---|---|---|---|
| 2013/0063774 A1* | 3/2013 | Nuggehalli | G06F 3/1207 358/1.15 |
| 2014/0309835 A1 | 10/2014 | Yamamoto | |
| 2015/0153970 A1 | 6/2015 | Tomida et al. | |
| 2015/0269461 A1* | 9/2015 | Wakai | G06K 15/1868 358/1.6 |
| 2015/0378652 A1 | 12/2015 | Sakurai | |
| 2017/0123737 A1* | 5/2017 | Januszewski | G06F 3/126 |
| 2017/0269878 A1* | 9/2017 | Taniguchi | G05D 1/0212 |

FOREIGN PATENT DOCUMENTS

| | | |
|---|---|---|
| JP | 2015-001863 A | 1/2015 |
| JP | 2015-052900 A | 3/2015 |
| JP | 2016-012878 A | 1/2016 |

OTHER PUBLICATIONS

October 7, 2019 Office Action issued in Korean Patent Application No. 10-2016-0116213.

* cited by examiner

FIG. 7
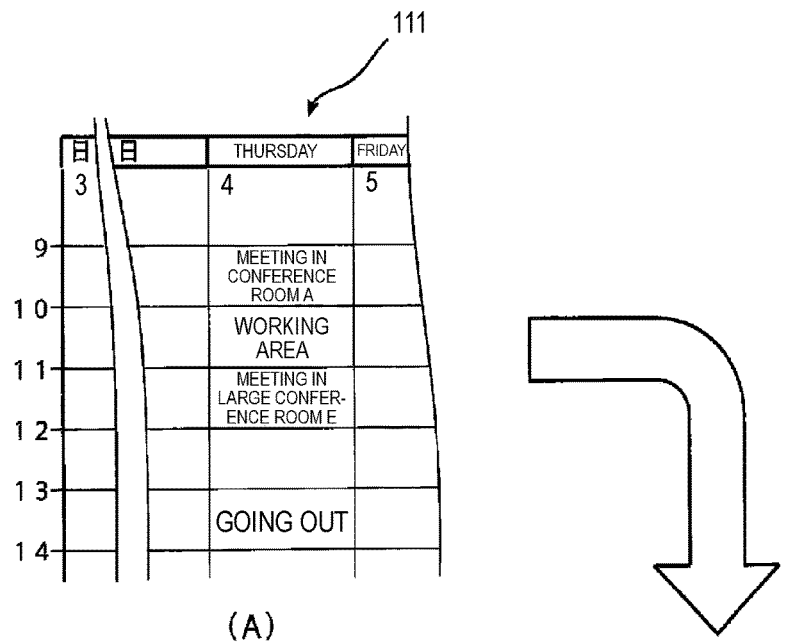
(A)
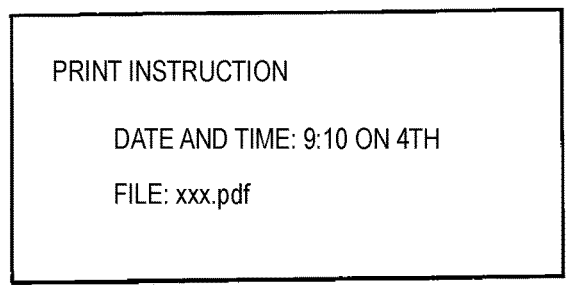
(B)
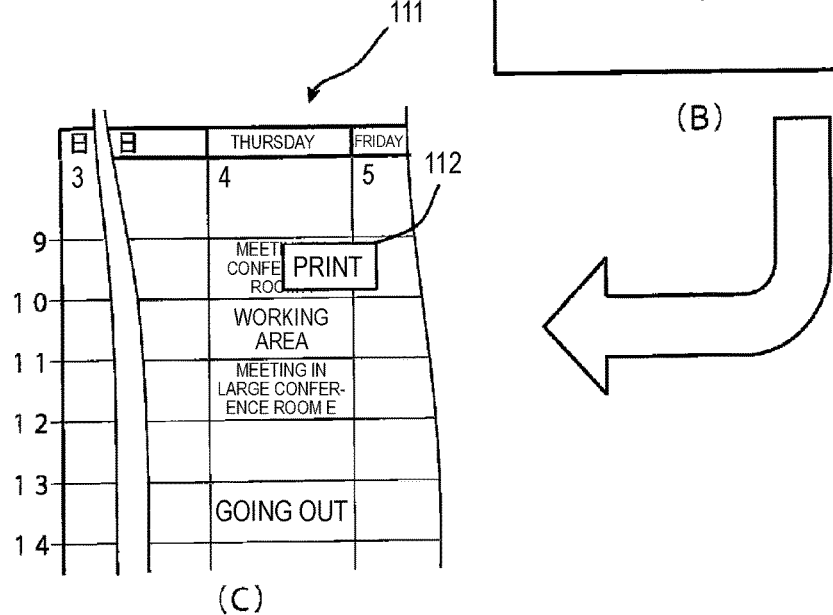
(C)

FIG. 11

PRINT INSTRUCTION RECEPTION NOTIFICATION

FOLLOWING PRINT INSTRUCTION WAS RECEIVED

DELIVERY LOCATION WAS SEARCHED
FROM SCHEDULER CALENDAR

DATE AND TIME: 9:10 ON 4TH

LOCATION: CONFERENCE ROOM A

FILE: xxx.pdf

PRINT INSTRUCTION/SCHEDULE CHANGE REQUEST

THERE IS FOLLOWING PRINT INSTRUCTION, BUT TODAY, YOU ARE SCHEDULED TO BE OUT ALL DAY LONG

PLEASE CHANGE PRINT INSTRUCTION OR SCHEDULE

DATE AND TIME: 9:10 ON 4TH

FILE: xxx.pdf

SCHEDULE CHANGE NOTIFICATION

PRINT SCHEDULE WAS CHANGED

NEW SCHEDULE IS AS FOLLOWS:

DATE AND TIME: 9:10 ON 4TH

LOCATION: YOUR SEAT

FILE: xxx.pdf

PRINT INSTRUCTION CHANGE REQUEST

THERE IS FOLLOWING PRINT SCHEDULE,
BUT SINCE YOU ARE SCHEDULED TO BE OUT
TODAY, PRINT SCHEDULE WAS CANCELED

PLEASE RE-INPUT PRINT INSTRUCTION

DATE AND TIME: 9:10 ON 4TH

LOCATION: CONFERENCE ROOM A

FILE: xxx.pdf

ARRIVAL NOTIFICATION

PRINTER ARRIVED AT NEARBY POSITION

DO YOU GIVE PERMISSION TO PRINT?

| YES | NO |

FIG. 19

ABSENCE NOTIFICATION

IT WAS DELIVERED, BUT IT WAS NOT PRINTED
BECAUSE YOU WERE ABSENT

• DO YOU LIKE TO RE-DELIVER IT
   TO YOUR SEAT?   | YES |

• DO YOU LIKE TO RE-DELIVER IT AT NEXT
   SCHEDULE (11:00 TO 12:00 IN LARGE
   CONFERENCE ROOM E)?   | YES |

• IS RE-DELIVERY UNNECESSARY?   | YES |

FIG. 20

PRINT PROHIBITION INSTRUCTION RECEPTION

IT WAS NOT PRINTED BECAUSE THERE WAS
PRINT PROHIBITION INSTRUCTION

- DO YOU LIKE TO RE-DELIVER IT
  TO YOUR SEAT?                                          YES

- DO YOU LIKE TO RE-DELIVER IT AT NEXT
  SCHEDULE (11:00 TO 12:00 IN LARGE                      YES
  CONFERENCE ROOM E)?

- IS RE-DELIVERY UNNECESSARY?                            YES

MOBILE PRINTING APPARATUS IN A PRINTING SYSTEM

CROSS-REFERENCE TO RELATED APPLICATIONS

This application is based on and claims priority under 35 USC 119 from Japanese Patent Application No. 2016-059312 filed on Mar. 24, 2016.

BACKGROUND

Technical Field

The present invention relates to a service providing system, a client apparatus, and a non-transitory computer readable medium.

SUMMARY

According to an aspect of the invention, there is provide a service providing system including: a mobile apparatus that moves to a user in response to receiving an instruction to provide a service from the user, and provides the service to the user after obtaining approval from the user; and a client apparatus that manages a schedule input by an operation by the user, and, in response to receiving the instruction to provide the service, which is input by an operation by the user, transmits an instruction to provide the service which is derived from the received instruction, the received instruction to provide the service including information of at least one of a designated date and time and a designated location at which the service is to be provided, wherein the client apparatus includes a display that displays a schedule in which a service providing schedule is added to the schedule input by the operation of the user according to a schedule display instruction given by an operation of the user, and the mobile apparatus moves to a scheduled location at a scheduled date and time and provides the service that is instructed to provide by the operation of the client apparatus.

BRIEF DESCRIPTION OF DRAWINGS

Exemplary embodiments of the present invention will be described in detail based on the following figures, wherein:

FIG. 7 is a diagram schematically illustrating a process in a print instruction scene in (A), (B), and (C);

FIG. 11 is a diagram illustrating an example of a display screen in step S224;

FIG. 12 is a diagram illustrating an example of a display screen in step S225;

FIG. 14 is a diagram illustrating an exemplary screen for giving a notification indicating that there is a change in the print output schedule to a user in step S124 in FIG. 13;

FIG. 15 is a diagram illustrating an exemplary screen for giving a notification indicating that there is a contradiction to a user in step S125 in FIG. 13;

FIG. 18 is a diagram illustrating an exemplary screen for informing a user of an arrival of a self-propelled printer;

FIG. 19 is a diagram illustrating an exemplary absence notification screen;

FIG. 20 is a diagram illustrating an example of a message screen displayed on a display screen of a client apparatus;

DETAILED DESCRIPTION

Hereinafter, an exemplary embodiment of the present invention will be described.

Figure 1:
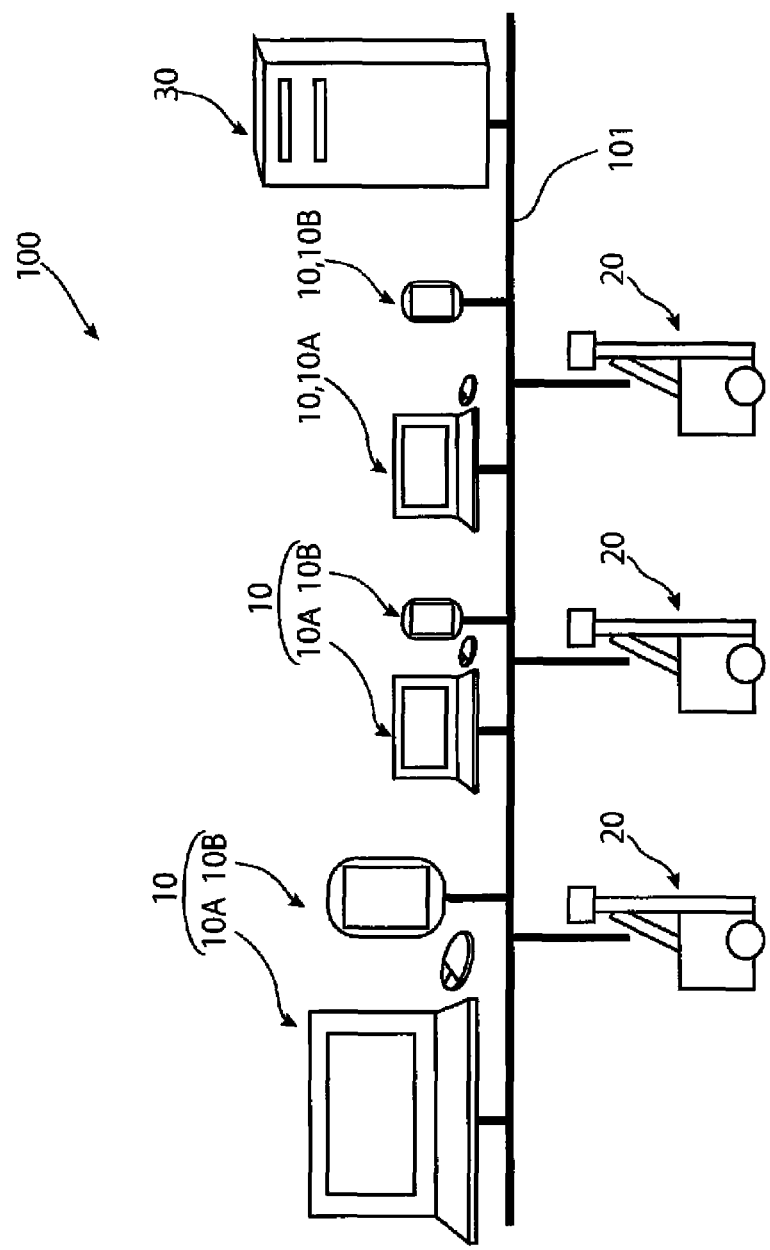
FIG. 1 is a diagram illustrating an overall configuration of a print system as an exemplary embodiment of a service providing system according to the present invention.

FIG. 1 is a diagram illustrating an overall configuration of a print system as an exemplary embodiment of a service providing system according to the present invention.

A print system 100 is a system in which a self-propelled printer 20 is included, and the self-propelled printer 20 moves to the user according to a print instruction given from the user and performs print output after obtaining approval from the user.

The print system 100 includes plural laptop personal computers (hereinafter, referred to as "laptop PCs") 10A or mobile terminals (hereinafter, referred to as "mobile terminals") 10B. A client apparatus 10 is constituted by the laptop PC 10A or the mobile terminal 10B itself or constituted such that the laptop PC 10A and the mobile terminal 10B synchronized with each other by the same user are paired with each other. As will be described later in detail, each of the client apparatuses 10 manages the schedule of the user using the client apparatus 10 or gives the print instruction.

The print system 100 includes three self-propelled printers 20 as an example. Each of the self-propelled printers 20 moves to a location at which the print output is to be performed at a time at which the print output is to be performed, and performs the print output under the approval of the user. The details thereof will be described later.

The print system 100 further includes a server apparatus 30. The server apparatus 30 is synchronized with the schedule of the user of the client apparatus 10 managed by each client apparatus 10, and thus the schedules of all client apparatuses 10 (all the users) are stored in the server apparatus 30. The server apparatus 30 receives the print instruction transmitted from each of the client apparatuses 10, and manages a file in which a date and time at which the print output is to be performed, a location at which the print output is to be performed, and image data to be printed are stored. As a time at which the print output is to be performed comes, the server apparatus 30 transfers the file to the self-propelled printer 20, designates a destination location, and instructs the self-propelled printer 20 to move to the location and perform the print output.

The client apparatuses 10, the self-propelled printers 20, and the server apparatus 30 illustrated in FIG. 1 are connected by a wireless local area network (LAN) 101 to be able to perform communication with one another.

Each of the client apparatuses 10, the self-propelled printers 20, and the server apparatus 30 has a function of an arithmetic processing device that executes a program and performs a process or an operation according to an executed program.

The print system 100 illustrated in FIG. 1 is arranged in an office having a layout to be described below as an example. The office is divided into two floors of a working area and a conference room, and two of the three self-propelled printers 20 are arranged on the working area floor, and the remaining one self-propelled printer 20 is arranged on the conference room floor.

Figure 2:
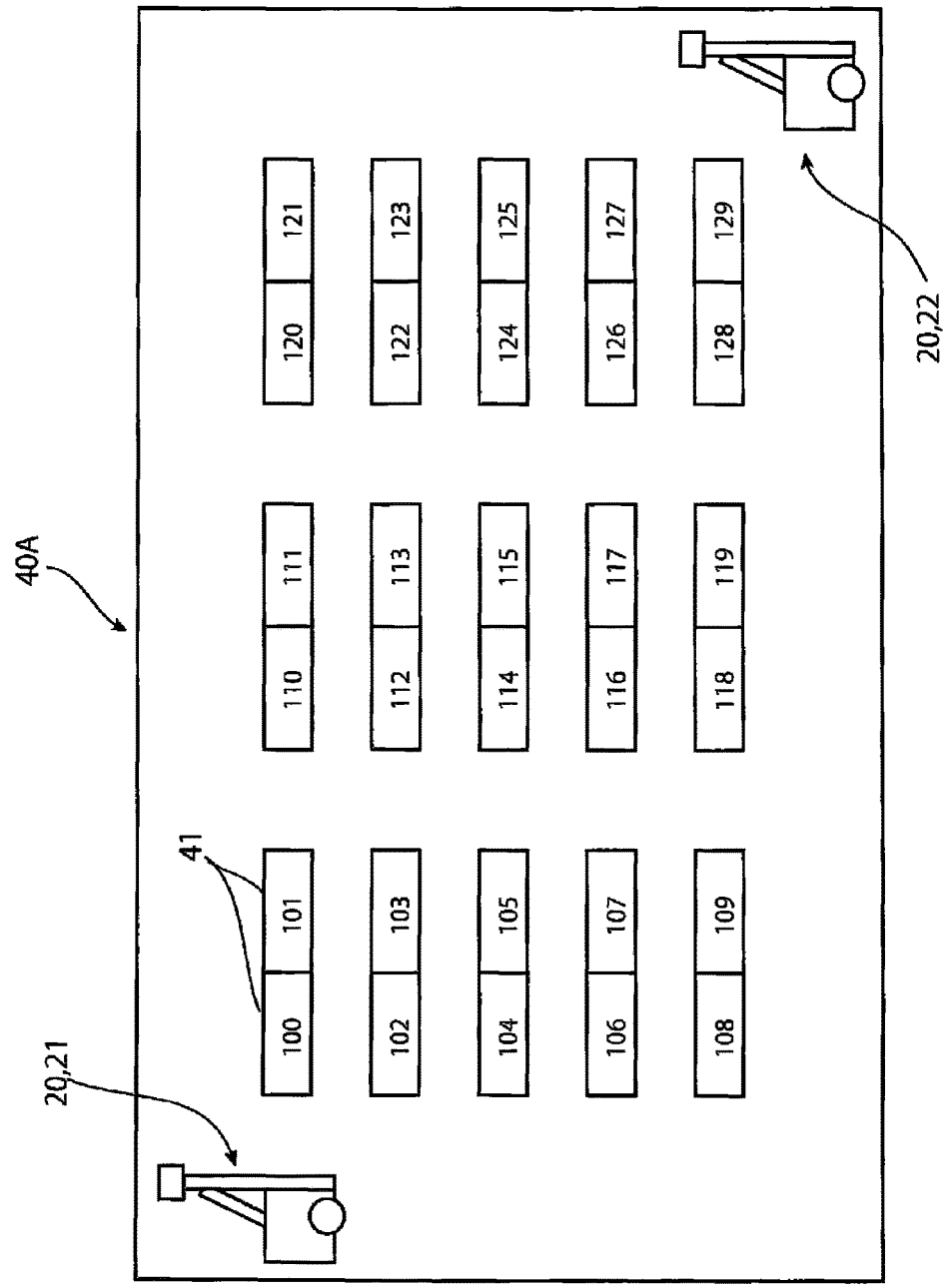
FIG. 2 is a diagram illustrating an arrangement of desks on a working area floor of an office.

FIG. 2 is a diagram illustrating an arrangement of desks on the working area floor of the office.

Plural desks 41 are arranged on a floor 40A. A specific number is allocated to each of the desks 41, an arrangement position of each desk, a number of each desk, and the overall layout of the floor 40A are stored in the server apparatus 30 as data. The data is transferred to the self-propelled printer 20 as necessary.

Two self-propelled printers 21 and 22 among the three self-propelled printers 20 illustrated in FIG. 1 are disposed on the floor 40A. Positions of the two self-propelled printers 21 and 22 illustrated in FIG. 2 are standby locations of the two self-propelled printers 21 and 22 on the floor 40A. A charging facility (not illustrated) is installed at each of the standby locations, and each of the self-propelled printers 21 and 22 is configured to move to the standby location, be charged by the charging facility, move by the energy, and perform the print output.

Figure 3:
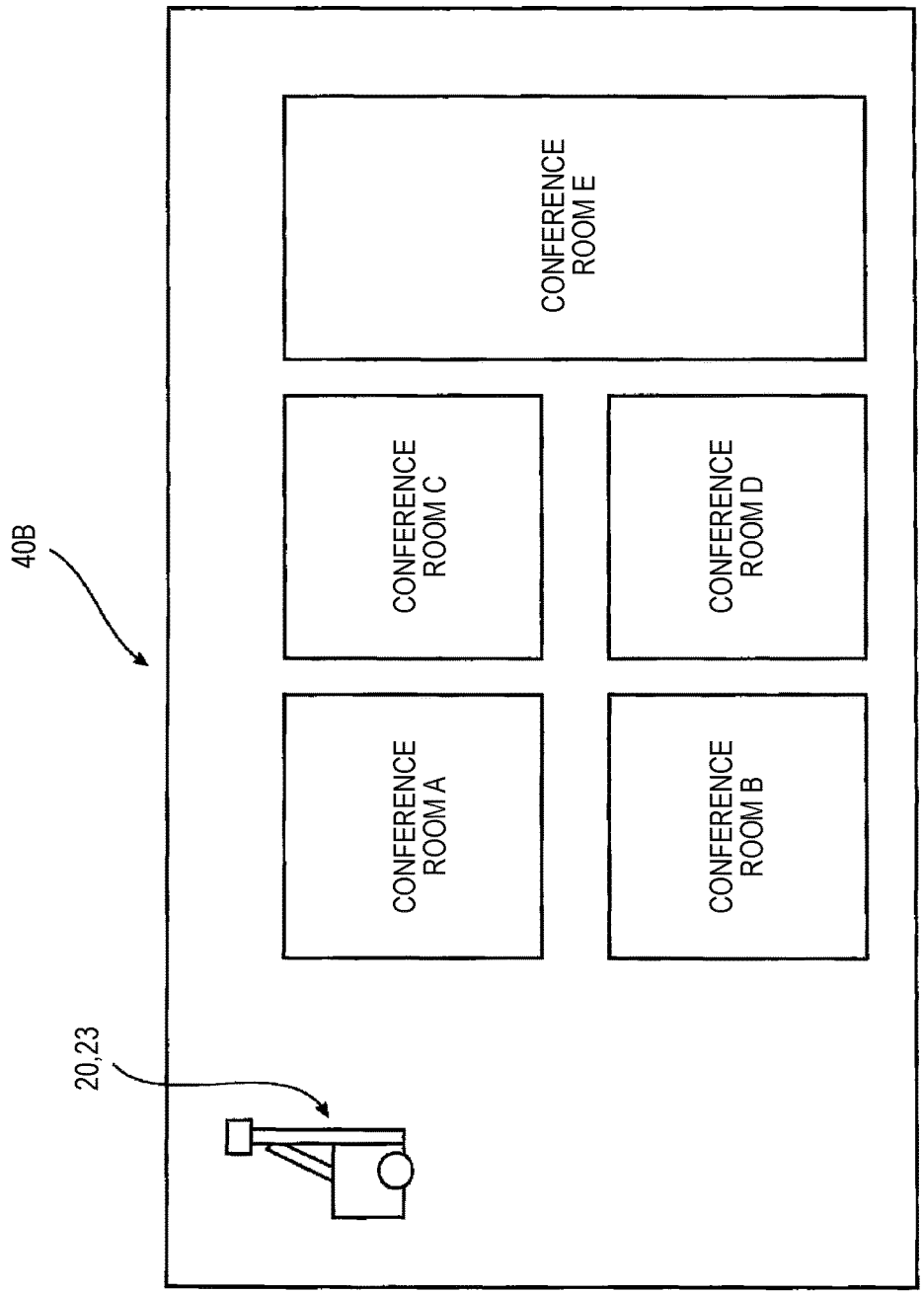
FIG. 3 is a diagram illustrating an arrangement of conference rooms on a conference room floor of an office.

FIG. 3 is a diagram illustrating an arrangement of conference rooms on the conference room floor of the office. Five conference rooms A to E are arranged on a floor 40B. The four conference rooms A to D among the five conference rooms A to E are small conference rooms, and the remaining one conference room E is a large conference room. The overall layout of the floor 40B such as the layout of the conference rooms A to E on the floor 40B, positions of entrances of the conference rooms A to E, the internal layout of the conference rooms A to E, and the like is also stored in the server apparatus 30 as data and transferred to the self-propelled printer 20 as necessary.

One self-propelled printer 23 among the three self-propelled printers 20 illustrated in FIG. 1 is disposed in the floor 40B. A position of the self-propelled printer 23 illustrated in FIG. 3 is the standby location of the self-propelled printer 23 in the floor 40B. Similarly to the working area floor 40A illustrated in FIG. 2, a charging facility (not illustrated) is installed at the standby location, and the self-propelled printer 23 is configured to move to the standby location, be charged by the charging facility, move by the energy, and perform the print output.

Figure 4:
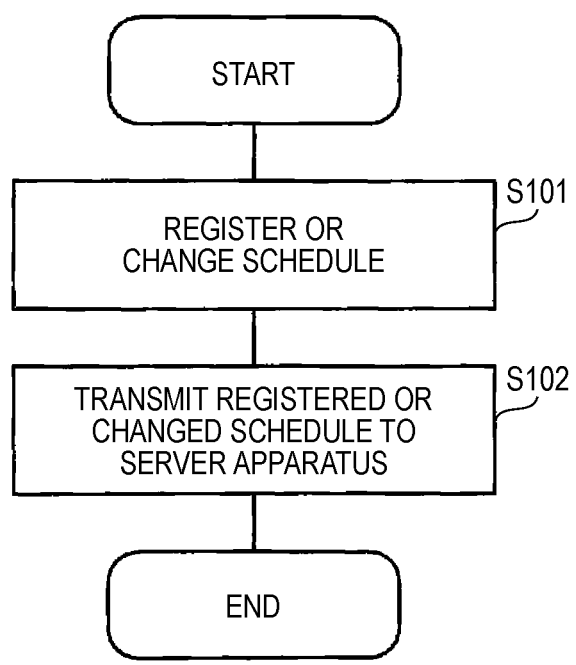
FIG. 4 is a diagram illustrating a process flow of a client apparatus in a scene in which the client apparatus is operated to register or change a schedule.

FIG. 4 is a diagram illustrating a process flow of the client apparatus in a scene in which the client apparatus is operated to register and change the schedule.

Figure 5:
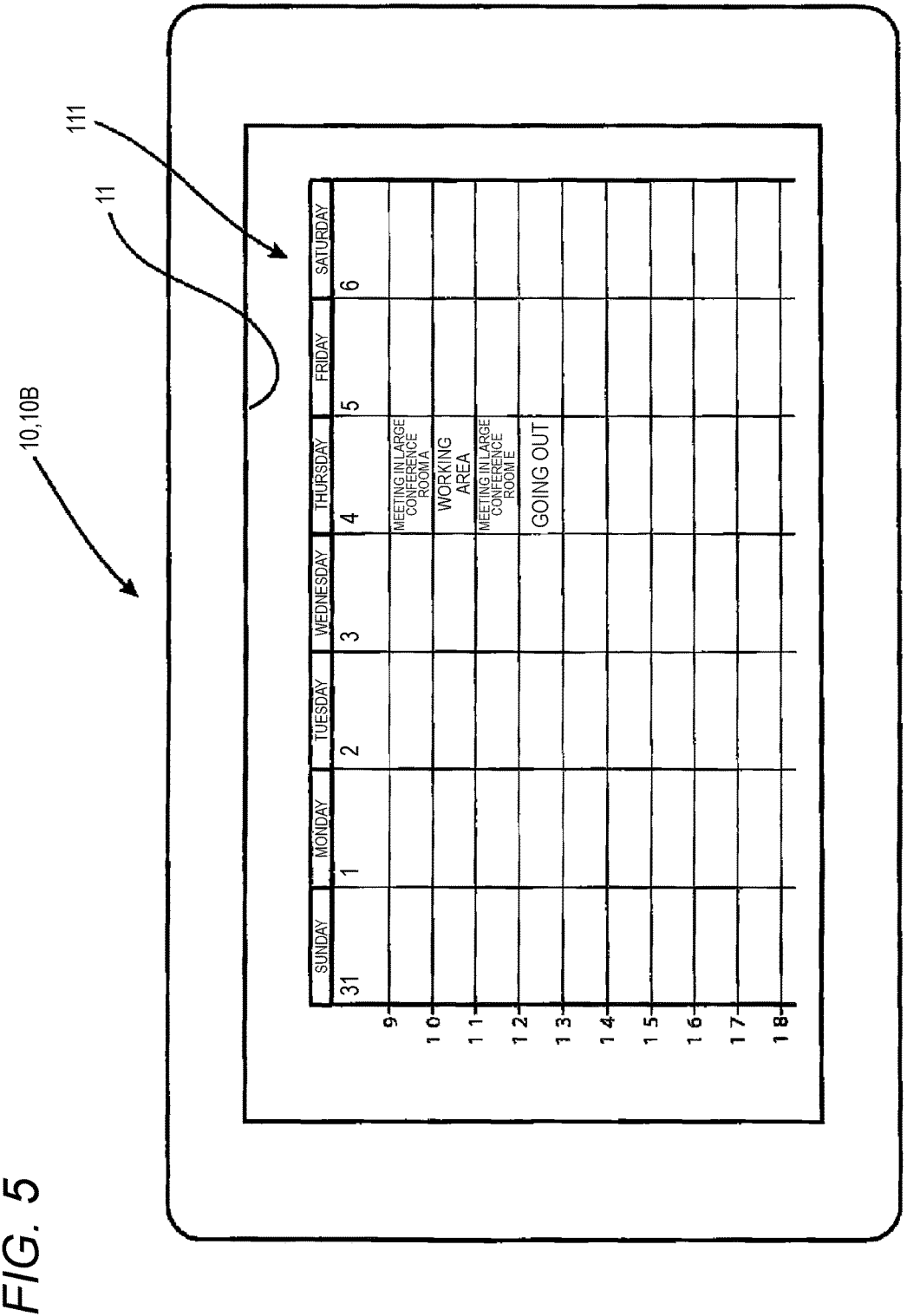
FIG. 5 is a diagram illustrating a schedule registration screen in a client apparatus (here, a mobile terminal)

FIG. 5 is a diagram illustrating a display screen in a scene in which the client apparatus (here, the mobile terminal) registers or changes the schedule.

Here, a scheduler for managing the schedule is activated by operating the client apparatus 10, and the schedule is registered or changed according to a process of the scheduler (step S101). The registered or changed schedule is transmitted to the server apparatus 30 (step S102).

A scheduler calendar 111 of the user who operates the mobile terminal 10B is displayed on a display screen 11 of the mobile terminal 10B illustrated in FIG. 5.

Figure 6:
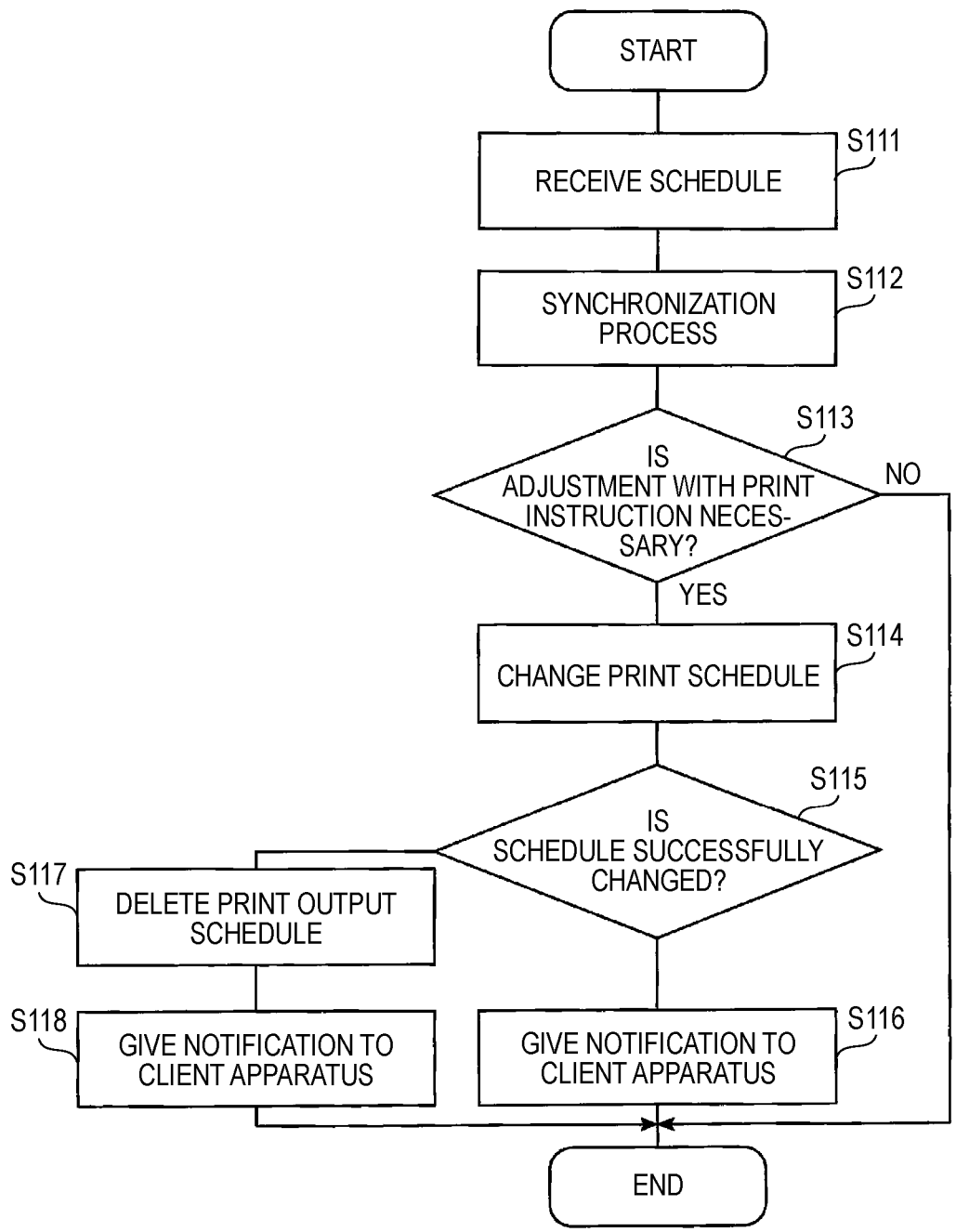
FIG. 6 is a diagram illustrating a process flow of a server apparatus in a scene in which a schedule is transmitted from a client apparatus.

FIG. 6 is a diagram illustrating a process flow of the server apparatus in a scene in which the schedule is transmitted from the client apparatus.

The server apparatus 30 performs a schedule synchronization process with all the client apparatuses 10 and stores updated schedules of all the client apparatuses 10.

Thus, upon receiving the schedule transmitted from the client apparatus 10 (step S111), the server apparatus 30 performs the synchronization process, that is, the process of updating to the latest schedule (step S112).

Step S113 in FIG. 6 and a process subsequent thereto relate to a print instruction process to be described below and thus will be described after a description of the print instruction process.

FIG. 7 is a diagram schematically illustrating a process in a print instruction scene in (A), (B), and (C).

The schedule of the user is assumed to be registered as illustrated in (A) of FIG. 7. The user is assumed to input a print instruction illustrated in (B) of FIG. 7 to the client apparatus 10. An example of (B) of FIG. 7 illustrates an instruction "print file:xxx.pdf at 9:10 on the 4th." Here, a location is not designated. In this regard, the scheduler calendar 111 of the user is here referred to. Since it is registered in the scheduler calendar 111 that the user will have a meeting in the conference room A at 9:10 on the 4th, a schedule indicating "print file:xxx.pdf in the conference room A at 9:10 on the 4th" is created, and a print output schedule 112 is added to the scheduler calendar 111 as illustrated in (C) of FIG. 7. Thus, when the user activates the scheduler by operating the client apparatus 10, the scheduler calendar 111 including the print output schedule 112 illustrated in (C) of FIG. 7 is displayed on the display screen 11 (see FIG. 5) of the client apparatus 10.

Here, of the date and time and the location at which the print output is to be performed, only the date and time is designated, and the location is specified based on the scheduler calendar. On the other hand, when of the date and time and the location at which the print output is to be performed, only the location is designated, in this exemplary embodiment, the nearest date and time in the future in a schedule in which the user will move to the designated location is specified with reference to the scheduler calendar. When a schedule in which the user will move to the designated location is not input to the scheduler calendar, there is a contradiction between the print instruction and the scheduler calendar, and thus a notification indicating the contradiction is given to the user.

Further, here, it is possible to designate both of the date and time and the location at which the print output is to be performed. However, in this case, it is confirmed whether or not there is a contradiction with the scheduler calendar with reference to the scheduler calendar of the user. A notification indicating the contradiction is given to the user when there is a contradiction, for example, when a schedule in which the user will move to another location different from a designated location at a date and time designated to perform the print output is registered.

Figure 8:
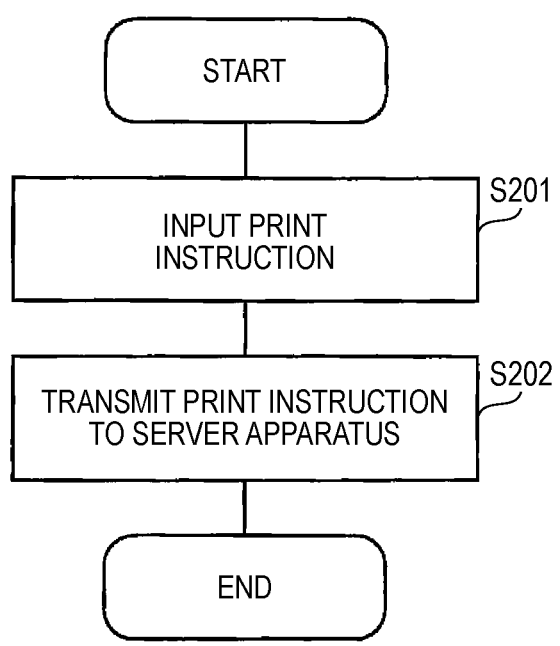
FIG. 8 is a diagram illustrating a process flow of a client apparatus in a scene in which a client apparatus is operated to give a print output instruction.

FIG. 8 is a diagram illustrating a process flow of the client apparatus in a scene in which the client apparatus is operated to give the print output instruction.

Here, when the print instruction is input (step S201), the input print instruction is transmitted to the server apparatus 30 (step S202).

Figure 9:
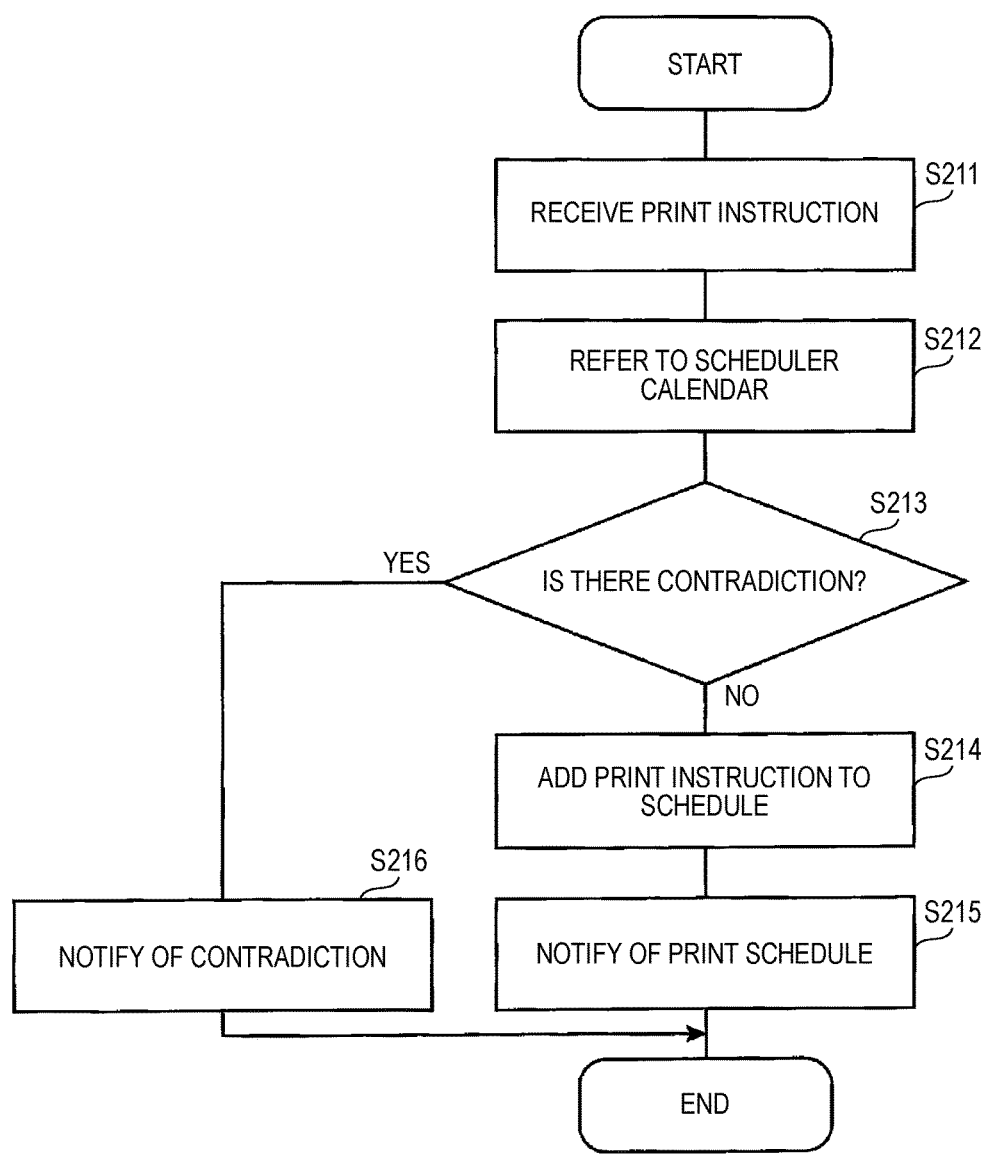
FIG. 9 is a diagram illustrating a process flow of a server apparatus in a scene in which a print instruction is received.

FIG. 9 is a diagram illustrating a process flow of the server apparatus in a scene in which the print instruction is received.

Upon receiving the print instruction transmitted from the client apparatus 10 (step S211), the server apparatus 30 confirms whether or not there is a contradiction between the schedule and the print instruction with reference to the scheduler calendar of the user of the client apparatus 10 (step S212). When there is no contradiction between the schedule and the print instruction, the print instruction is added to the schedule (step S214), and a notification indicating a print output schedule is given to the client apparatus 10 (step S215). Here, when one of the date and time and the location at which the print output is to be performed is designated in the print instruction, a process of acquiring information of the other of the date and time and the location from the scheduler calendar is performed as described above.

On the other hand, when there is a contradiction between the schedule and the print instruction (step S213), a notification indicating the contradiction is given to the client apparatus 10 (step S216).

Figure 10:
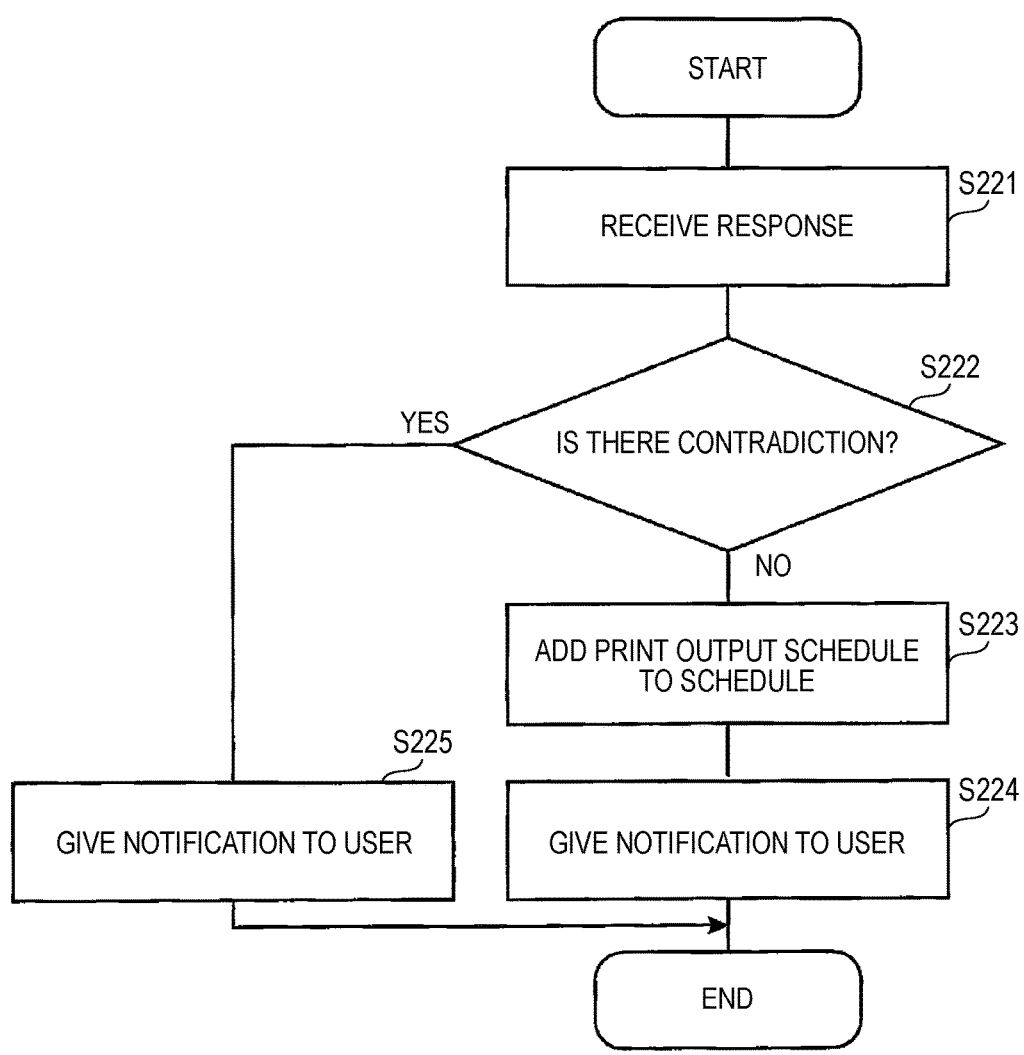
FIG. 10 is a diagram illustrating a process flow of a client apparatus in a scene in which the client apparatus receives a response to a print instruction from a server apparatus.

FIG. 10 is a diagram illustrating a process flow of the client apparatus in a scene in which the client apparatus receives a response to the print instruction from the server apparatus.

Upon receiving the response to the print instruction from the server apparatus 30 (step S221), the client apparatus 10 determines whether or not a contradiction is pointed out (step S222). When there is no contradiction, the client apparatus 10 adds the print output schedule to the scheduler calendar managed by the client apparatus 10 (step S223), and gives a notification that the print instruction is received to the user by displaying the notification on the display screen of the client apparatus 10 (step S224).

FIG. 11 is a diagram illustrating an example of the display screen in step S224.

Here, information indicating that the print instruction is received is displayed. When an "OK" button is pushed, the display disappears, but thereafter, when the scheduler is activated, the scheduler calendar 111 including the print output schedule 112 added thereto is displayed as illustrated in (C) of FIG. 7.

When the current print instruction is determined to have a contradiction with the schedule in step S222 of FIG. 10, a notification indicating content of the contradiction is given to the user (step S225).

FIG. 12 is a diagram illustrating an example of a display screen in step S225.

Content of the contradiction between the current print instruction and the scheduler calendar is displayed on the screen.

Here, a notification indicating content of the contradiction is merely given, but when there is an instruction from the user after the notification indicating content of the contradiction is given, the print instruction in which the contradiction is included may be registered. For example, in this example, since only a date and time (9:10 on the 4th) is designated, and a location is not designated, the user may be encouraged to designate both of a date and time and a location, and the print instruction in which both of a date and time and a location are designated may be registered without change although there is a contradiction that the schedule overlaps an outing as illustrated in FIG. 12.

Here, the contradiction between the print instruction and the schedule in the scene in which the print instruction is given has been described. The same may happen even in a scene in which the schedule is registered or changed. In the above example, for example, a meeting in the conference room A starting from 9:00 on the 4th may be canceled, and the user may work on the working area floor 40A (see FIG. 2) during that period of time and then go out all day long. In this example, since 9:10 on the 4th is designated in the original print instruction, but no location is designated, at the stage in which the meeting in the conference room A is canceled, and the user works in the working area floor 40A (see FIG. 2) during that period of time, the print instruction is dealt as a print instruction in which no date and time is changed, but the location is changed from the conference room A to the working area. At this stage, it is necessary to adjust the location, but no contradiction occurs. On the other hand, thereafter, when a schedule in which the user will be out all day long is input, a contradiction between the schedule and the print instruction occurs.

Based on the above description, step S113 in FIG. 6 and a process subsequent thereto are described with reference back to FIG. 6.

After the schedule transmitted from the client apparatus 10 is received (step S111), and the synchronization process (step S112) is then performed, it is determined whether or not it is necessary to adjust the updated schedule and the received print instruction (step S113). As described above, although it is necessary to adjust, it does not necessarily indicate that there is a contradiction. When no adjustment is necessary, the process ends without change.

On the other hand, when it is unnecessary to adjust, the print output schedule is changed (step S114).

However, when there is a contradiction with the schedule, it is difficult to change the schedule although an attempt to adjust is made. In this regard, it is determined whether or not the schedule is successfully changed (step S115). When the print output schedule is successfully changed, a notification indicating a new schedule is given to the client apparatus 10 (step S116). On the other hand, when the schedule fails to be changed, that is, when a contradiction with the print output schedule registered until that time occurs since the schedule is registered or changed, the contradictory print output schedule is deleted (step S117), and a notification indicating the contradiction is given to the client apparatus 10 (step S118).

Figure 13:
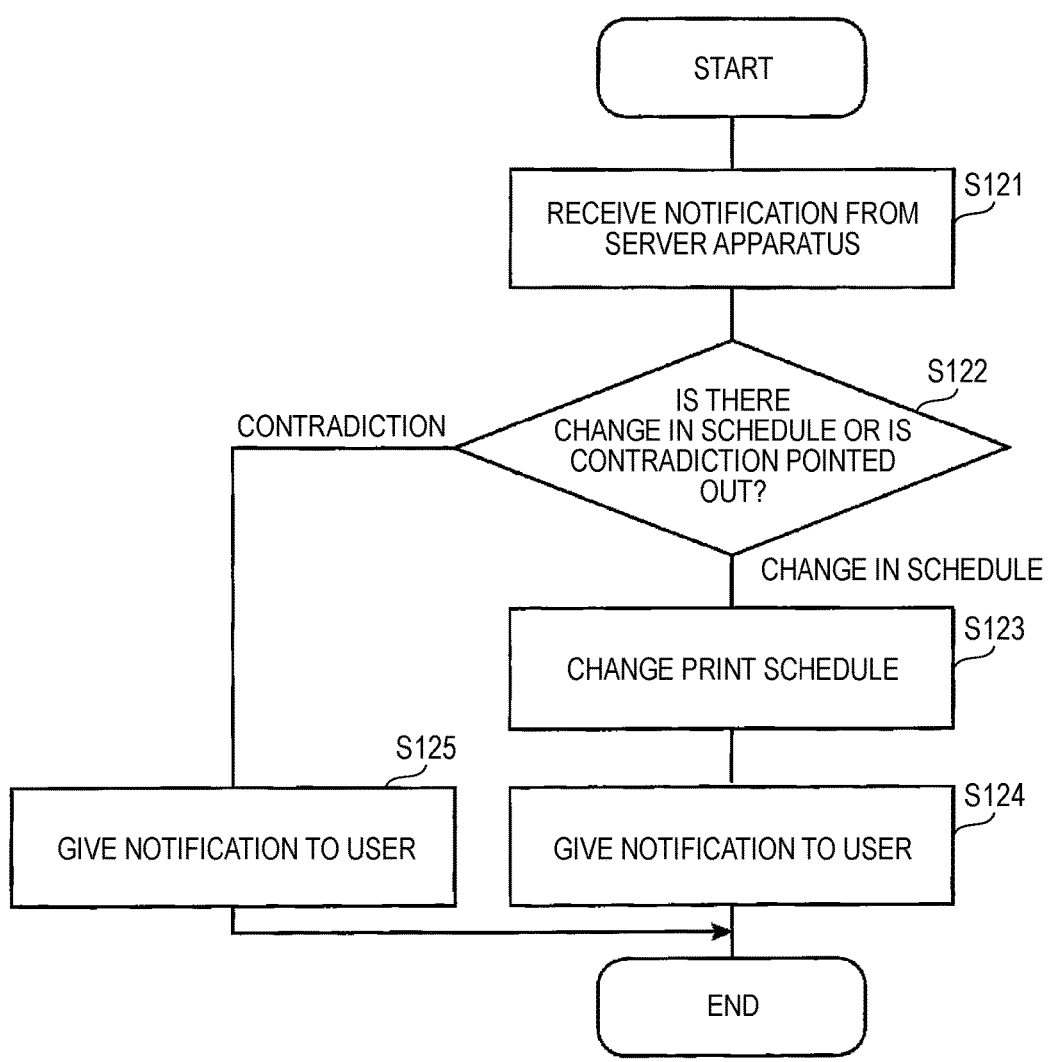
FIG. 13 is a diagram illustrating an exemplary screen for giving a notification indicating that there is a change in the print output schedule to a user in step S124 in FIG. 13.

FIG. 13 is a diagram illustrating a process flow of the client apparatus when a notification indicating a change in the print output schedule or information of pointing out a contradiction is received in a scene in which the schedule is registered or changed.

Here, first, when a notification indicating a change in the print output schedule or information of pointing out a contradiction is received from the server apparatus 30 (step S121), it is determined whether there is a change in the schedule or a contradiction is pointed out (step S122).

When there is a change in the print output schedule, the print output schedule 112 (see (C) of FIG. 7) of the scheduler calendar managed by the client apparatus 10 is changed (step S123), and a notification indicating the change is given to the user (step S124).

On the other hand, when a contradiction is pointed out (step S122), a notification indicating content of the contradiction is given to the user (step S125). In this exemplary embodiment, the contradictory print output schedule is deleted (step S117 in FIG. 6), but similarly to the scene (step S216 in FIG. 9) in which the contradiction is pointed out when the print instruction is given, the contradictory print output schedule may remain without change according to the instruction of the user.

FIG. 14 is a diagram illustrating an exemplary screen for giving a notification indicating that there is a change in the print output schedule to the user in step S124 in FIG. 13.

Here, a print output location in the above example (see (A) to (C) in FIG. 7) is changed from the conference room A to the seat of the user.

FIG. 15 is a diagram illustrating an exemplary screen for giving a notification indicating that there is a contradiction to the user in step S125 in FIG. 13. In the exemplary screen illustrated in FIG. 15, since a schedule to go out is included, a message indicating that the print output at 9:10 on the 4th is not available is displayed.

Next, a print output scene will be described.

Figure 16:
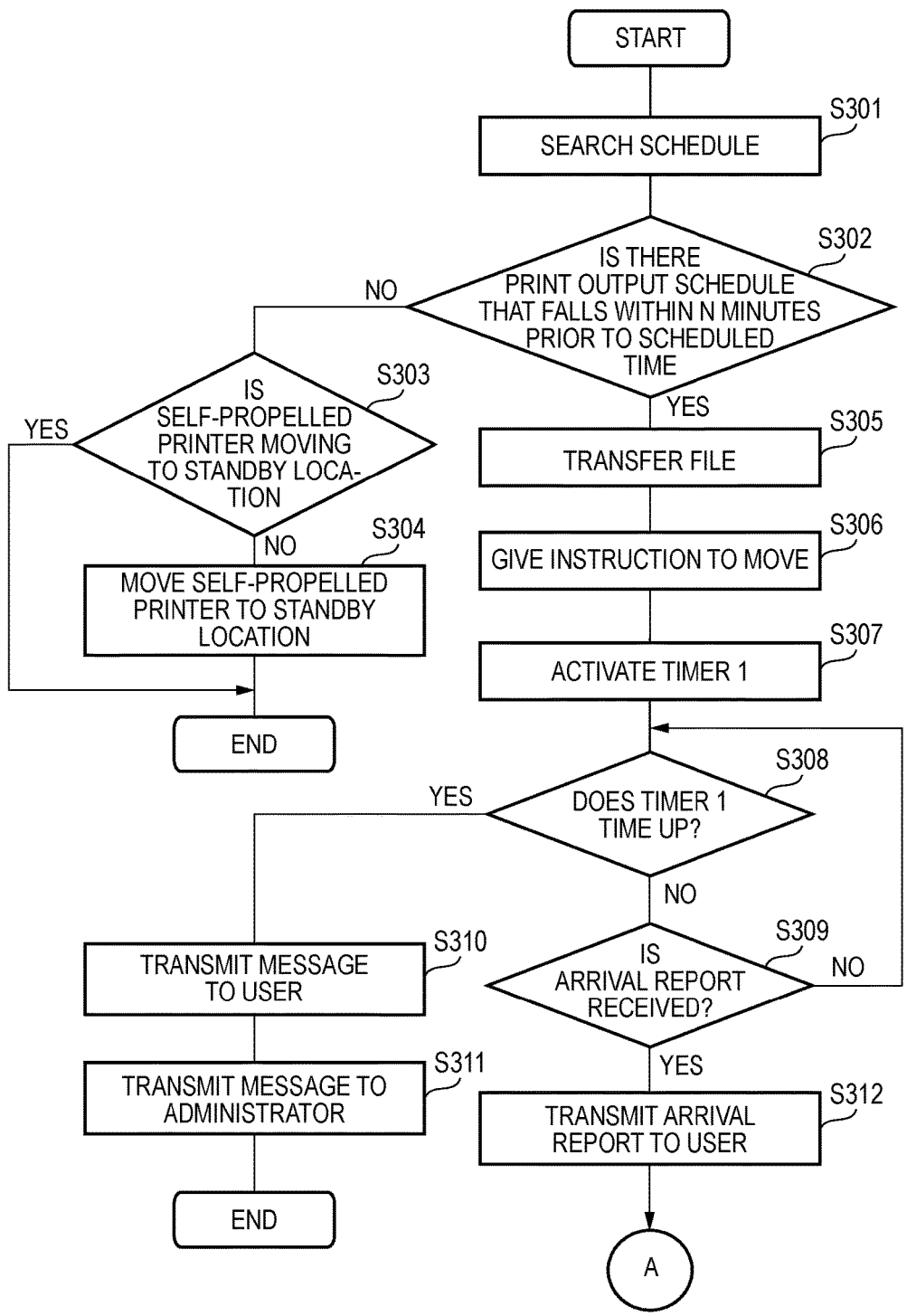
FIG. 16 is a diagram illustrating a first half part of a process flow of a server apparatus in a print output scene.

FIG. 16 is a diagram illustrating a first half part of a process flow of the server apparatus in the print output scene.

Figure 17:
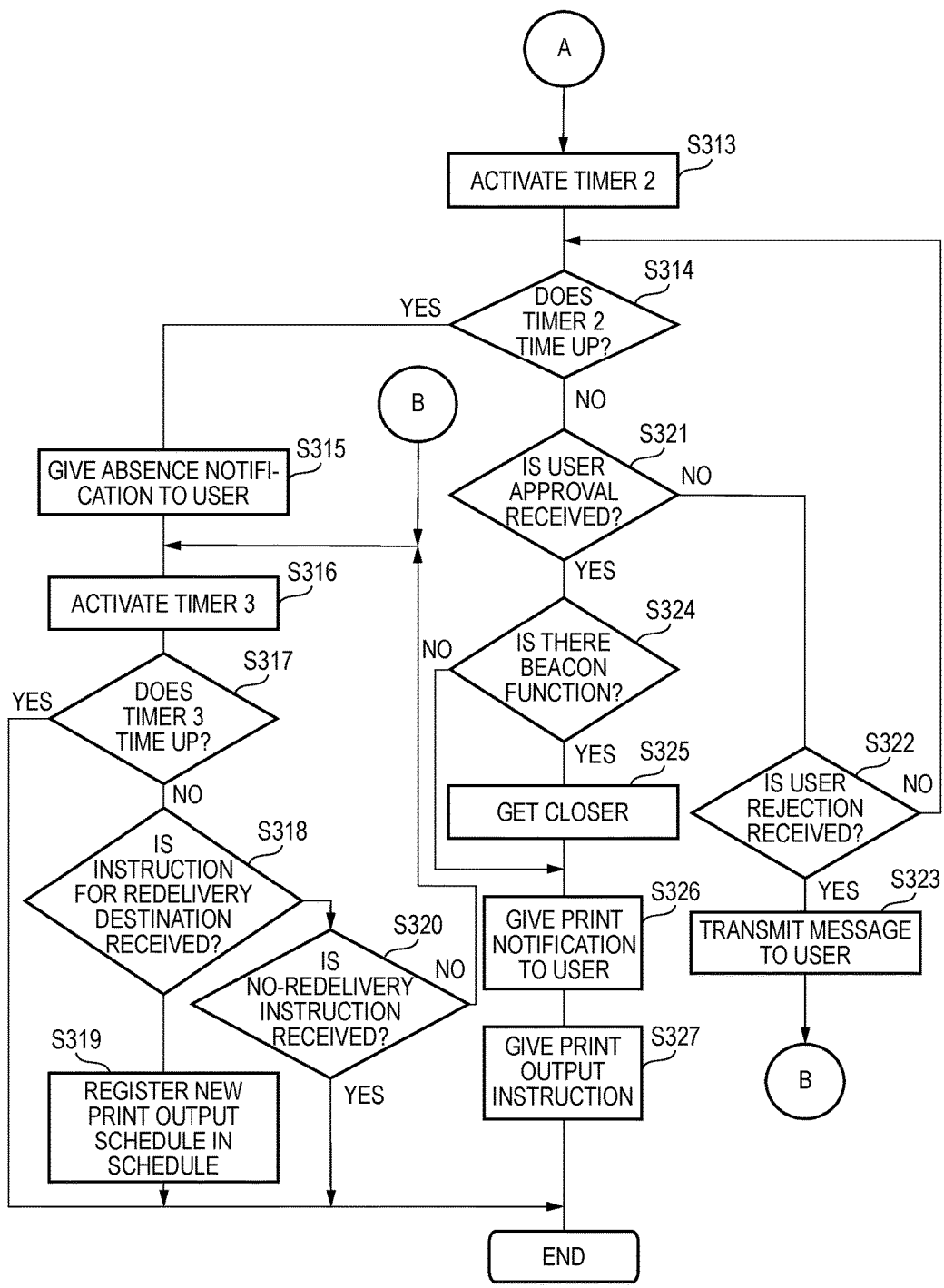
FIG. 17 is a diagram illustrating a second half part of a process flow of a server apparatus in a print output scene.

FIG. 17 is a diagram illustrating a second half part of a process flow of the server apparatus in the print output scene.

The processes illustrated in FIGS. 16 and 17 are repeatedly performed at short time intervals, for examples, at intervals of 10 seconds. It is desirable that a time unit of the print output schedule be one minute, and in that sense, the processes illustrated in FIGS. 16 and 17 be performed at intervals of one minute. However, in the case of the print instruction requiring an immediate print output, if the process is performed at intervals of one minute, the operation is delayed for a maximum of one minute after the print instruction is given. Thus, the process is here performed at shorter time intervals, for example, at intervals of 10 seconds.

When execution of the processes illustrated in FIGS. 16 and 17 starts, the schedules of all the client apparatuses 10, that is, the schedules of all the users participating in the system are searched (step S301), and it is determined whether or not there is a print output schedule that falls within N minutes (for example, five minutes) prior to a scheduled time (step S302). However, a schedule that has been determined to be close to the scheduled time at the stage at which the processes illustrated in FIGS. 16 and 17 have been performed before currently performed and already proceeded to the print output process is excluded from the determination. Further, when there are plural print output schedules that fall within N minutes prior to the scheduled time, the processes illustrated in FIGS. 16 and 17 are assumed to be repeatedly performed by the number of schedules that falls within N minutes prior to the scheduled time.

Here, N minutes refer to a period of time that is set in advance as a period of time necessary for movement of the self-propelled printer 20 or preparation of the print output. For example, N minutes may differ according to the floors 40A and 40B (see FIGS. 2 and 3) or may differ according to a distance between the standby location of the self-propelled printer 20 and the print output location even on the same floor.

When there is no print output schedule that falls within N minutes prior to the scheduled time (step S302), it is determined whether or not the self-propelled printer 20 excluding the self-propelled printer that has started to perform the print output process is moving to the standby location (step S303). When the self-propelled printer 20 is moving to a different location from the standby location, an instruction to cause the self-propelled printer 20 to move to the standby location is given (step S304), and the process ends.

On the other hand, when there is a print output schedule that newly falls within N minutes prior to the scheduled time, a file for the print output is transferred to the self-propelled printer 20 (step S305).

Here, the two self-propelled printers 21 and 22 are disposed on the working area floor 40A illustrated in FIG. 2, but one of the two self-propelled printers 21 and 22 to which the current print output is assigned is determined according to a predetermined algorithm. For example, when one self-propelled printer is operating for another print output, the remaining one self-propelled printer is currently used. When both of the two self-propelled printers 20 are in the standby state, the self-propelled printer 20 at the position close to the destination is used. Alternatively, when there is a difference in a print output capability between the two self-propelled printers 20, for example, when one self-propelled printer 20 is suitable for a small amount of print output, and the other self-propelled printer 20 is suitable for a large amount of print output, and a large amount of print output is scheduled to be performed as the current print output, the self-propelled printer suitable for a large amount of print output is used.

Subsequently to the file transfer (step S305), an instruction to move the self-propelled printer 20 to the location is given by transferring information of the destination to self-propelled printer 20 (step S306), and a timer 1 is activated (step S307). The timer 1 is a timer for measuring a sufficient time necessary for moving until the self-propelled printer 20 that is instructed to move moves to the destination.

When the self-propelled printer 20 arrives at the destination indicated by the instruction, a report indicating an arrival at the server apparatus 30 is transmitted from the self-propelled printer 20. When the timer 1 times up (step S308) before the report is received (step S309), a possibility of the occurrence of a certain trouble that prevents the self-propelled printer 20 from arriving at the destination is high, for example, the self-propelled printer 20 is likely to be broken or the passage of the self-propelled printer 20 is likely to be blocked by an obstacle. In this case, a notification indicating the occurrence of a trouble is given to the user through the client apparatus 10 (step S310), and a message indicating the occurrence of a trouble is transmitted to an administrator of the system as well (step S311).

When the arrival report is received from the self-propelled printer 20 before the timer 1 times up (step S309), the arrival report destined for the user is transmitted to the client apparatus 10 that has given the instruction to perform the current print output (step S312). The client apparatus 10 notifies the user of the arrival of the self-propelled printer 20 by causing the arrival report to be displayed on the display screen.

FIG. 18 is a diagram illustrating an exemplary screen for informing the user of an arrival of the self-propelled printer.

The user can notice that the self-propelled printer 20 has arrived at a position nearby the user by viewing the screen. Since there are cases in which the user is away from the seat even when the user is scheduled to be sitting on his/her seat on the working area floor 40A (see FIG. 2), in this exemplary embodiment, the user is informed of the arrival of the self-propelled printer 20 through the display of the screen illustrated in FIG. 18.

When a "YES" button is pushed on the screen illustrated in FIG. 18, the self-propelled printer 20 performs the print output. The print output execution scene will be described in detail later. On the other hand, when a "NO" button is pushed on the screen illustrated in FIG. 18, the print output is not performed at the current stage. This point will be described in detail later.

When the arrival report destined for the user is transmitted in step S312 in FIG. 16, a timer 2 is activated (step S313 in FIG. 17). The timer 2 is a timer that sets a standby time for obtaining print output approval from the user at an arrival location after the self-propelled printer 20 arrives.

The screen illustrated in FIG. 18 is displayed on the display screen of the client apparatus 10 of the user, but when there is no instruction of "YES" or "NO" from the user until the timer 2 times up, (step S314), an absence notification destined for the user is transmitted (step S315), and a timer 3 is further activated (step S316). The timer 3 is also used for measuring a response time from the user.

FIG. 19 is a diagram illustrating an exemplary absence notification screen.

Upon receiving the absence notification (step S315) from the server apparatus 30, the client apparatus 10 causes the absence notification screen illustrated in FIG. 19 to be displayed on the display screen of the client apparatus 10.

On the screen, in addition to information (the absence notification) indicating that there is no response from the user, an instruction for a redelivery destination (a next destination of the self-propelled printer 20 for the current print output) is included. When there is an instruction for the redelivery destination, the print output schedule for the redelivery destination is created and newly registered in the scheduler calendar (step S319). On the other hand, when there is a no-redelivery instruction (step S320), the print output is not performed, and the current print output process ends. When there is neither the redelivery instruction (step S318) nor the no-redelivery instruction (step S320) until the timer 3 times up (step S317), in the exemplary embodiment, it is regarded as the no-redelivery instruction, and the process ends.

When there is the arrival report destined for the user (see step S132 in FIG. 6 and FIG. 18), and there is a rejection (pushing of the "NO" button in FIG. 18) from the user before the timer 2 times up (step S322), a message destined for the user corresponding to the rejection is transmitted to the client apparatus 10 (step S323) and displayed on the display screen of the client apparatus 10.

FIG. 20 is a diagram illustrating an example of a message screen displayed on the display screen of the client apparatus in this scene.

Upon receiving the message (step S323) from the server apparatus 30, the client apparatus 10 causes a screen of FIG. 20 which is similar to the absence notification screen of FIG. 19 to be displayed on the display screen thereof. In the server apparatus 30, a process subsequent to the process of activating the timer 3 in step S316 is performed.

When there is the print output approval (pushing of the "YES" button in FIG. 18) from the user before the timer 2 times up after there is the arrival report destined for the user (see step S312 in FIG. 16 and FIG. 18) (step S323), it is determined whether or not a beacon function is installed in a corresponding space (step S321 in FIG. 17). The beacon function will be described later. When the beacon function is not installed, a notification indicating the print output is given to the user (step S326), and an instruction to perform the print output is transmitted from the server apparatus 30 to the self-propelled printer 20 (step S327). Upon receiving the instruction, the self-propelled printer 20 performs the print output. The notification of step S326 may be a notification that is given to the user through the client apparatus 10 or may be a notification that is given to the user such that, for example, "print" is displayed on the self-propelled printer 20 or a sound of "print" is output from the self-propelled printer 20.

Next, the beacon function will be described.

In this exemplary embodiment, the beacon function is installed on the conference room E on the conference room floor 40B illustrated in FIG. 3.

When the user is sitting on his/her seat, the self-propelled printer 20 moves to the position nearby the seat of the user, and performs the print output. When the user stays in the small conference room, the print output is performed at the entrance of the conference room. However, when the user stays in the large conference room, if the print output is performed at the entrance of the conference room, the user is forced to go to the entrance of the large conference room and pick up the print and thus likely to feel troublesome. In this regard, in this exemplary embodiment, the beacon function is installed in the large conference room E, and the self-propelled printer 20 enters the conference room E and performs the print output at a position closer to the user.

Figure 21:
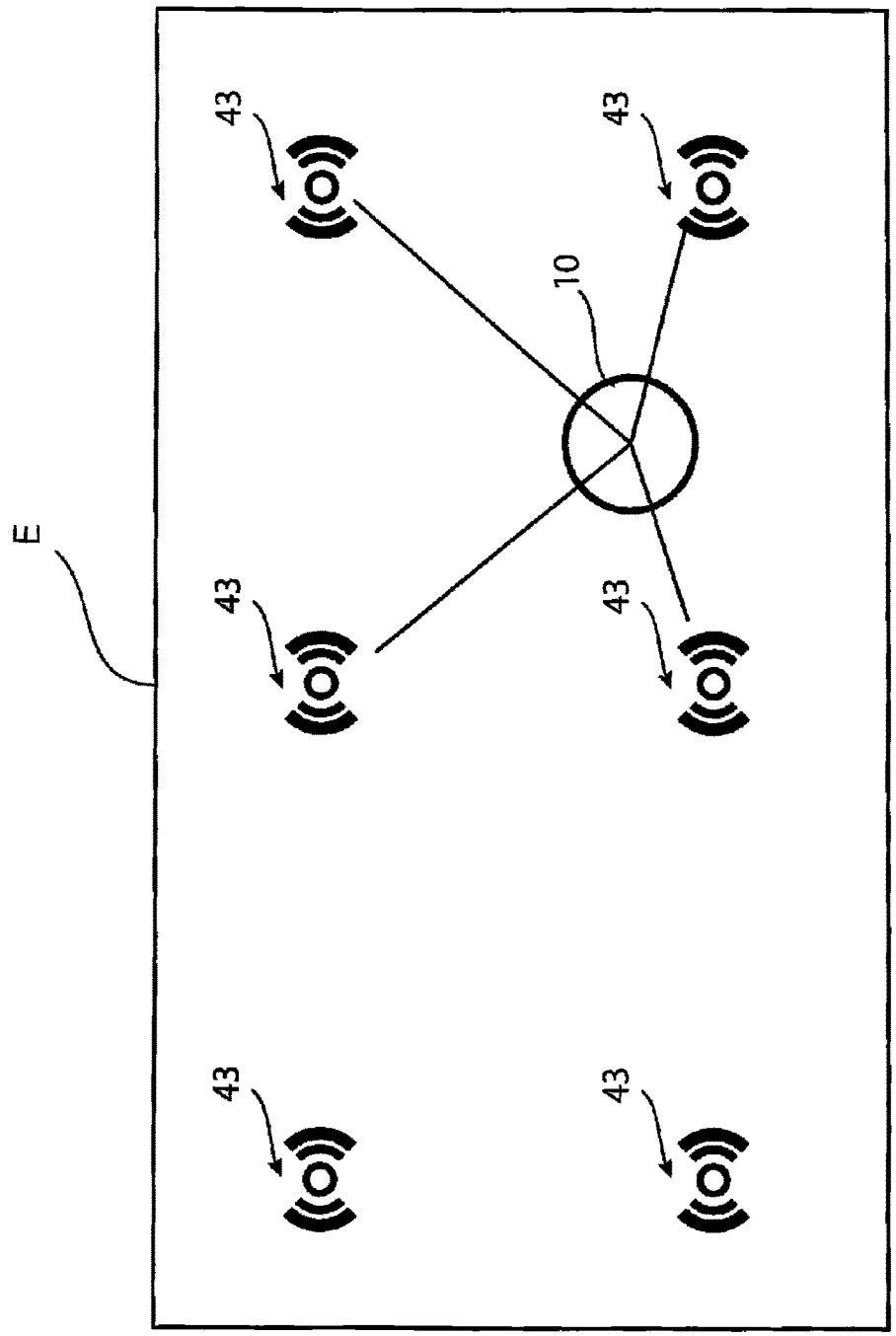
FIG. 21 is a conceptual diagram illustrating a beacon function installed in a large conference room.

FIG. 21 is a conceptual diagram illustrating the beacon function installed in the large conference room.

Beacons 43 are installed at plural positions (six positions in an example illustrated FIG. 21) of an inner wall or a ceiling in the large conference room E. The beacon 43 corresponds to an example of a distance measuring apparatus according to the present invention. Each of the beacons 43 transmits a radio wave that is receivable by the client apparatus 10. The radio wave includes ID information specifying each of the beacons 43. Installation positions of the beacons 43 and IDs of the beacons 43 are registered in the server apparatus 30 in advance.

Figure 22:
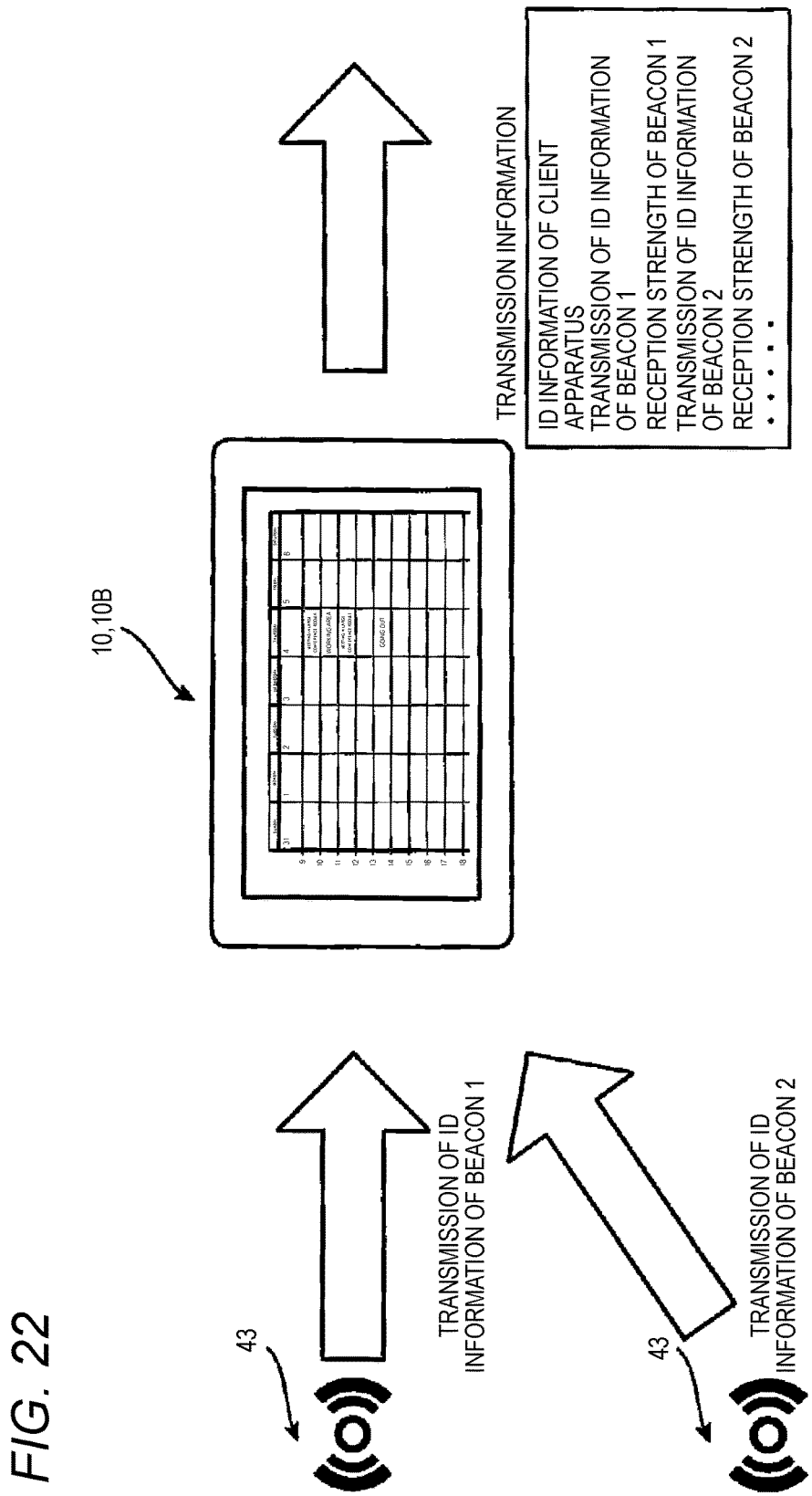
FIG. 22 is an explanatory diagram for describing a principle of measuring a position of a client apparatus using a beacon.

FIG. 22 is an explanatory diagram for describing a principle of measuring the position of the client apparatus using the beacon.

The client apparatus 10 (here, the mobile terminal 10B) receives the ID information transmitted from the plural beacons 43, associates the ID information with reception strength of the radio waves transmitted from the beacons 43, adds ID information of the client apparatus 10 (the mobile terminal 10B), and transmits the resulting information to the server apparatus 30. Thus, the server apparatus 30 can detect the position of the client apparatus 10 (the mobile terminal 10B) in the large conference room E. Even when there are the plural client apparatuses 10 (the mobile terminals 10B) in the large conference room E at the same time, the server apparatus 30 can specify the position of the client apparatus 10 (the mobile terminal 10B) related to the current print output based on the ID information of the client apparatus 10 (the mobile terminal 10B).

The description is continued with reference back to FIG. 17.

In the case of the space having the beacon function (step S324), the self-propelled printer 20 gets closer to the client apparatus 10 (the user) whose position is specified using the beacon function (step S325), and then the print notification is given to the user (step S326), and the print output is performed (step S327).

In the exemplary embodiment, when only information of one of a date and time and a location is included in the print instruction, the server apparatus 30 performs the process of compensating for insufficient information with reference to the scheduler calendar, but this process may be performed by the client apparatus 10. In other words, in this case, when of the designated date and time and the designated location at which the service is to be provided, only information of the designated date and time is included in the instruction to provide the service, which is input by the user who operates the client apparatus 10, the client apparatus 10 transmits an instruction to provide the service in which information of the service providing location determined based on the designated date and time included in the instruction to provide the service and the schedule of the user managed by the client apparatus is added to the instruction to provide the service which is input by the operation of the user. Further, when of the designated date and time and the designated location at which the service is to be provided, only information of the designated location is included in the instruction to provide the service, which is input by the user who operating the client apparatus 10, the client apparatus 10 transmits an instruction to provide the service in which information of the service providing date and time determined based on the designated location included in the instruction to provide the service and the schedule of the user managed by the client apparatus is added to the instruction to provide the service input by the operation of the user.

In the exemplary embodiment, when information of both of the date and time and the designated location at which the service is to be provided is included in the instruction to provide the service, which is input by the user, the server apparatus 30 performs the process of investigating whether or not there is a contradiction between a pair of the designated date and time and the designated location included in the instruction to provide the service and the schedule of the user, but this process may be performed by the client apparatus 10 as well.

Here, the print system 100 of FIG. 1 including the server apparatus 30 has been described as an example, but the present invention can be applied even to a print system including no server apparatus 30. In the case of the print system including no server apparatus 30, each of the client apparatuses 10 undertakes the function of the server apparatus 30 described herein, and direct communication is performed between the client apparatus 10 and the self-propelled printer 20. The system including no server apparatus 30 is a small-scale self-propelled printer system in which, for example, only one self-propelled printer 20 is provided. A modification to the system in which the client apparatus 10 undertakes the function of the server apparatus 30 is obvious, and a description thereof is here omitted.

The print system in which the self-propelled printer is provided to perform the print out at the destination has been described as an example of the service providing system according to the present invention, but the present invention is not necessarily limited to the print system. For example, the present invention can be applied to any service providing system such as a delivery system for delivering documents or products or a keeping system in which documents or products from the user are kept at the destination.

In the foregoing description, the expression such as "in response to receiving the instruction to provide the service, which is input by an operation by the user, transmits an instruction to provide the service which is derived from the received instruction" may mean that not only transmitting the input instruction itself but transmitting instruction that is modified or to which information is added is included.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The description of embodiments may disclose the following matters.

[1] A server apparatus includes:

a synchronization processing unit that synchronizes a schedule of a user with a client apparatus that manages a schedule input by an operation of the user, wherein in response to receiving an instruction to provide a service that is input by an operation by the user, the client apparatus transmits an instruction to provide the service, the received instruction to provide the service including information of at least one of a designated date and time and a designated location at which the service is to be provided;

an instruction receiving unit that receives the instruction to provide the service which is transmitted from the client apparatus; and an instruction transmitting unit, wherein in a case where the instruction to provide the service which is received by the instruction receiving unit includes information of the designated date and time at which the service is to be provided and does not include information of the designated location at which the service is to be provided, the instruction transmitting unit transmits the instruction to provide the service to the mobile apparatus based on a service providing schedule in which information of a service providing location determined based on the designated date and time included in the instruction to provide the service, which is received by the instruction receiving unit, and the schedule of the user synchronized with the client apparatus is added to the instruction to provide the service which is input by the operation by the user.

[2] A non-transitory computer readable medium stores a server program that causes an information processing apparatus to operate as a server apparatus including:

a synchronization processing unit that synchronizes a schedule of a user with a client apparatus that manages a schedule input by an operation by the user, wherein in response to receiving an instruction to provide a service that is input by an operation by the user, the client apparatus transmits an instruction to provide the service, the received instruction to provide the service including information of at least one of a designated date and time and a designated location at which the service is to be provided;

an instruction receiving unit that receives the instruction to provide the service which is transmitted from the client apparatus; and an instruction transmitting unit, wherein in a case where the instruction to provide the service which is received by the instruction receiving unit includes information of the designated date and time at which the service is to be provided and does not include information of the designated location at which the service is to be provided, the instruction transmitting unit transmits the instruction to provide the service to the mobile apparatus based on a service providing schedule in which information of a service providing location determined based on the designated date and time in the instruction to provide the service, which is received by the instruction receiving unit, and the schedule of the user synchronized with the client apparatus is added to the instruction to provide the service which is input by the operation by the user.

What is claimed is:

1. A service providing system comprising:
   a mobile apparatus that moves to a user in response to receiving an instruction to provide a service from the user, and provides the service to the user after obtaining approval from the user; and
   a client apparatus that manages a schedule input by an operation by the user, and in response to receiving the instruction to provide the service, which is input by an operation by the user, transmits an instruction to provide the service which is derived from the received instruction, the received instruction to provide the service including information of at least one of a designated date and time and a designated location at which the service is to be provided, wherein
   the client apparatus includes a display that displays a calendar including the schedule input by the operation of the user, and in which a service providing schedule is added to the schedule input by the operation of the user according to a schedule display instruction given by an operation of the user, the calendar including at least one entry indicating a place where the user will be at a time of a date,
   the mobile apparatus moves to a scheduled location at a scheduled date and time and provides the service that is instructed to provide by the operation of the client apparatus, and
   when the instruction to provide the service which is input by the user operating the client apparatus include both the information of the designated date and time at which the service is to be provided and the information of the designated location at which the service is to be provided are included in the instruction to provide the service, and when there is a contradiction between a pair of the designated date and time and the designated location included in the instruction to provide the service and the schedule of the user managed by the client apparatus, the client apparatus gives a notification indicating that there is the contradiction to the user.

2. The service providing system according to claim 1, wherein
   when the instruction to provide the service which is input by the user includes information of the designated date and time at which the service is to be provided and does not include information of the designated location at which the service is to be provided, the client apparatus transmits the instruction to provide the service in which information of a service providing location determined based on the designated date and time included in the instruction to provide the service and the schedule of the user managed by the client apparatus is added to the instruction to provide the service which is input by the operation by the user.

3. The service providing system according to claim 2, wherein
   when the instruction to provide the service which is input by the user includes the information of the designated location at which the service is to be provided and does not include the information of the designated date and time at which the service is to be provided, the client apparatus transmits the instruction to provide the service in which information of a service providing date and time determined based on the designated location included in the instruction to provide the service and the schedule of the user managed by the client apparatus is added to the instruction to provide the service input by the operation by the user.

4. The service providing system according to claim 1, further comprising:
   a server apparatus including
      a synchronization processing unit that synchronizes the schedule of the user operating the client apparatus with the client apparatus,
      an instruction receiving unit that receives the instruction to provide the service which is transmitted from the client apparatus, and
      an instruction transmitting unit, wherein,
   when the instruction to provide the service which is received by the instruction receiving unit includes information of the designated date and time at which the service is to be provided and does not include information of the designated location at which the service is to be provided, the instruction transmitting unit transmits the instruction to provide the service to the mobile apparatus based on a service providing schedule in which information of a service providing location determined based on the designated date and time included in the instruction to provide the service, which is received by the instruction receiving unit, and the schedule of the user synchronized with the client apparatus is added to the instruction to provide the service which is input by the operation by the user.

5. The service providing system according to claim 4, wherein
   when the instruction to provide the service which is received by the instruction receiving unit includes information of the designated location at which the service is to be provided and does not include information of the designated date and time at which the service is to be provided, the instruction transmitting unit transmits the instruction to provide the service to the mobile apparatus based on a service providing schedule in which information of a service providing date and time determined based on the designated location included in the instruction to provide the service, which is received by the instruction receiving unit, and the schedule of the user synchronized with the client apparatus is added to the instruction to provide the service which is input by the operation by the user.

6. The service providing system according to claim 4, wherein
   the server apparatus includes a notifying unit, and
   when the instruction to provide the service which is received by the instruction receiving unit includes both the information of the designated date and time at which the service is to be provided and the information of the designated location at which the service is to be provided, and when there is a contradiction between a pair of the designated date and time and the designated location and the schedule of the user synchronized with the client apparatus, the notification unit gives a notification indicating that there is the contradiction to the client apparatus.

7. The service providing system according to claim 1, wherein
   when the mobile apparatus that has moved to the location at which the service is to be provided at the date and time at which the service is to be provided does not obtain approval from the user who has given the instruction to provide a service, a notification indicating that the service is not available is given to the client apparatus operated by the user.

8. The service providing system according to claim 7, wherein the client apparatus has a function of giving the service providing instruction again according to the operation of the user who operates the client apparatus after the notification is received.

9. The service providing system according to claim 1, further comprising:
a distance measuring apparatus that is installed at plural places and measures a distance to the client apparatus, wherein
the mobile apparatus moves to a location of the client apparatus that has transmitted the instruction to provide the service, the location of the client apparatus being specified based on information obtained using the distance measuring apparatus.

10. A client apparatus that manages a schedule input by an operation by a user, the client apparatus comprising:
a display, wherein
in response to receiving an instruction to provide a service which is input by an operation by the user, the client apparatus transmits an instruction to provide the service that is derived from the received instruction to provide the service, the received instruction to provide the service including information of at least one of a designated date and time and a designated location at which a service is to be provided by a mobile apparatus that is self-propelled and provides the service,
the display displays a calendar including the schedule input by the operation of the user, and in which a schedule of the date and time and the location at which the service is to be provided is added to a schedule input by an operation of the user according to a schedule display instruction given by an operation of the user, the calendar including at least one entry indicating a place where the user will be at a time of a date,
when the instruction to provide the service which is input by the user operating the client apparatus include both the information of the designated date and time at which the service is to be provided and the information of the designated location at which the service is to be provided are included in the instruction to provide the service, and when there is a contradiction between a pair of the designated date and time and the designated location included in the instruction to provide the service and the schedule of the user managed by the client apparatus, the client apparatus gives a notification indicating that there is the contradiction to the user.

11. A non-transitory computer readable medium storing a client program that causes an information processing apparatus to operate as a client apparatus that manages a schedule input by an operation by a user, the client program causing the client apparatus to execute:
in response to receiving an instruction to provide a service which is input by an operation by the user, transmitting an instruction to provide the service that is derived from the received instruction to provide the service, the received instruction to provide the service including information of at least one of a designated date and time and a designated location at which a service is to be provided by a mobile apparatus that is self-propelled and provides the service, wherein
the client apparatus comprises a display that displays a calendar including the schedule input by the operation of the user, and in which a schedule of the date and time and the location at which the service is to be provided is added to a schedule input by an operation of the user according to a schedule display instruction given by an operation of the user, the calendar including at least one entry indicating a place where the user will be at a time of a date; and
when the instruction to provide the service which is input by the user operating the client apparatus include both the information of the designated date and time at which the service is to be provided and the information of the designated location at which the service is to be provided are included in the instruction to provide the service, and when there is a contradiction between a pair of the designated date and time and the designated location included in the instruction to provide the service and the schedule of the user managed by the client apparatus, giving a notification indicating that there is the contradiction to the user.

* * * * *